(12) United States Patent
Maruichi et al.

(10) Patent No.: US 9,205,581 B2
(45) Date of Patent: Dec. 8, 2015

(54) FILM IN-MOLD INJECTION MOLD DEVICE AND MOLDING METHOD USING THE SAME

(71) Applicant: Panasonic Corporation, Osaka (JP)

(72) Inventors: Taishi Maruichi, Hyogo (JP); Taro Tsujii, Osaka (JP); Hideo Mine, Nara (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 447 days.

(21) Appl. No.: 13/741,451

(22) Filed: Jan. 15, 2013

(65) Prior Publication Data

US 2013/0207320 A1 Aug. 15, 2013

(30) Foreign Application Priority Data

Feb. 14, 2012 (JP) .................................. 2012-029372

(51) Int. Cl.
*B29C 45/14* (2006.01)

(52) U.S. Cl.
CPC ................................ *B29C 45/14262* (2013.01)

(58) Field of Classification Search
None
See application file for complete search history.

(56) References Cited

U.S. PATENT DOCUMENTS

| 2008/0248148 A1 | 10/2008 | Chang et al. | |
| 2009/0166920 A1* | 7/2009 | Tokunou et al. | 264/219 |
| 2010/0007054 A1* | 1/2010 | Tseng | 264/319 |

FOREIGN PATENT DOCUMENTS

| CN | 101279487 B | 11/2010 |
| JP | 01-241416 A | 9/1989 |
| JP | 04-290725 A | 10/1992 |
| JP | 2000-61979 A | 2/2000 |
| JP | 2008-094038 A | 4/2008 |
| JP | 2011-104961 A | 6/2011 |

OTHER PUBLICATIONS

CN Office Action and Search Report for Application No. 201310017783.X dated Nov. 3, 2014, with English Translation.
JP Office Action for counterpart JP application 2012-029372, May 7, 2014.

* cited by examiner

*Primary Examiner* — Monica Huson
(74) *Attorney, Agent, or Firm* — RatnerPrestia

(57) ABSTRACT

A film in-mold injection mold device, including: a first mold that has an injection port configured to inject a molding material; and a second mold that is configured to face the first mold and has a sucking mechanism configured to suck a film to be supplied at a time of molding, wherein the second mold has a movable protruding part configured to touch, when the film is sucked, the film before the film touches an outer periphery edge part of a concave part which is formed on the second mold depending on a shape of an article to be molded, so as to temporarily ensure a space between the outer periphery edge part and the film.

3 Claims, 6 Drawing Sheets

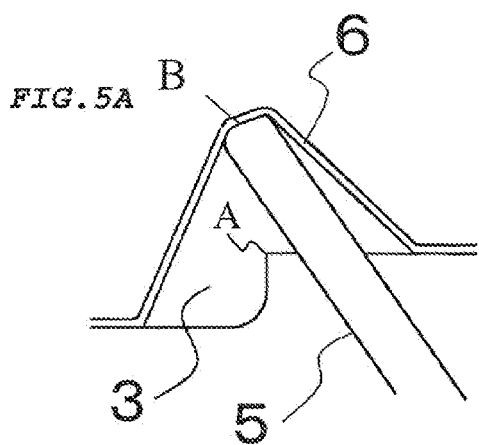
FIG.5A
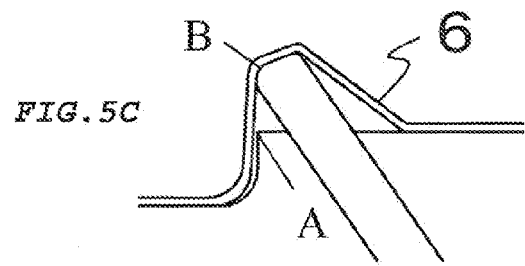
FIG.5C
FIG.5B
FIG.5D
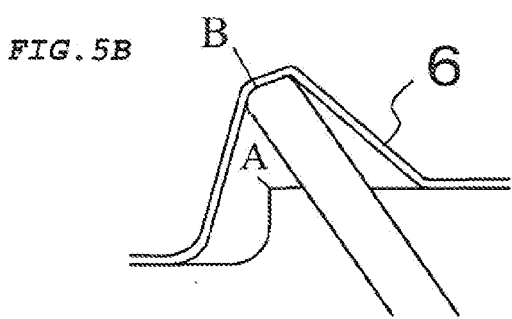
FIG.5E
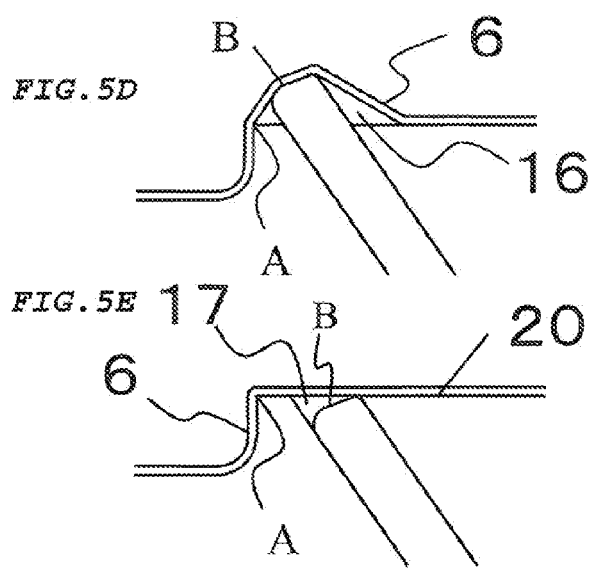
FIG.6
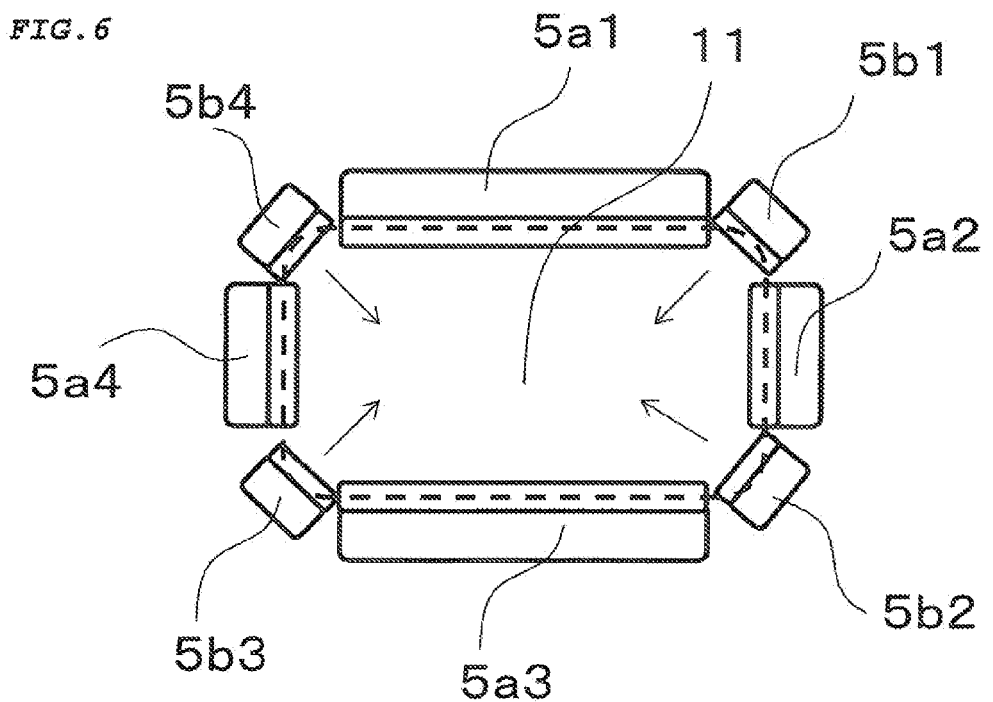

FILM IN-MOLD INJECTION MOLD DEVICE AND MOLDING METHOD USING THE SAME

BACKGROUND OF THE INVENTION

1. Field of the Invention

The present invention relates to an injection mold device for molded articles such that high extension percentages are required in film in-mold resin injection molding, and a molding method using the same.

2. Related Art of the Invention

In conventional film in-mold resin injection molding with an injection mold device for molded articles such that high extension percentages are required, a decorative film 6 is placed in a mold at a stage preceding the mold clamping for injection molding, sucking is performed, and then the decorative film 6 is allowed to fit a mold decorative-face-side insert 2 to implement molding. FIGS. 8-10 are tectonic profiles of a general film in-mold injection mold device. FIG. 8 shows a state where the mold is opened, FIG. 9 shows a state where the decorative film 6 is set at the time of mold opening, and FIG. 10 shows a state where the decorative film 6 is sucked at the time of mold opening.

As shown in FIG. 8, the decorative film 6 is, at the time when the mold is opened, set between a non-decorative-face-side insert 1 and the decorative-face-side insert 2. As shown in FIG. 9, the decorative film 6 which has been set as shown in FIG. 8 is clamped with mold foil-presser plates 4. As shown in FIG. 10, the decorative film 6 which has been clamped as shown in FIG. 9 is sucked in the direction of the decorative-face-side insert 2, and is extended so as to gradually fit a product-shaping part 3. In this way, molding is implemented without breaking the decorative film 6 at the time of mold clamping (see, for example, Japanese Patent Laid-Open No. 2008-94038).

SUMMARY OF THE INVENTION

However, in the above-described conventional configuration, as shown in FIG. 11, the mold edge A of the decorative-face-side insert 2 is a base point of the extension of the decorative film 6 when the decorative film 6 is sucked. Here, FIG. 11 is an enlarged view of a region 100 shown in FIG. 10. In a case where a high extension percentage is required of the decorative film 6 at a base point of the mold edge A, since the sucked decorative film 6, being caught at the mold edge A of the product-shaping part 3 of the decorative-face-side insert 2, starts to extend at the edge base point, the surface of the decorative film 6 can be damaged and broken easily. The occurrence of damages of the decorative film 6 at the time of film sucking will cause breaks of the film at the time of mold clamping and imperfect molding. When the decorative film 6 is broken at the time of film sucking, a pigmented layer of the decorative film 6 will be splashed and adhere to the surface of the decorative-face-side insert 2. Not only will the transcription of the pigmented layer, which has adhered to the surface, to the article to be molded at the next shot cause poor appearance and difficulty of successive molding, but mold maintenance will be required each time. Even if the molding is carried out safely, transcription of the damages of the film to the molded article will deteriorate the quality of external appearance. Here, the mold foil-presser plates 4 clamp the decorative film 6 on the circumference of the product-shaping part 3 so that no position aberration of the decorative film 6 will be produced during the molding.

Moreover, even in a case where damages and breaks do not occur, since the decorative film 6 is locally extended at a base point of the mold edge A, a film decorative layer in the neighborhood of the mold edge A will be extended out to cause pale color of the decorative face and occurrence of microcracks, which can remarkably deteriorate the external appearance of a molded article.

The present invention, which is to solve the above-described problems, provides a film in-mold injection mold device capable of alleviating local extension of the decorative film 6 compared with conventional ones, and a molding method using the same.

The $1^{st}$ aspect of the present invention is a film in-mold injection mold device, comprising:

a first mold that has an injection port configured to inject a molding material; and a second mold that is configured to face the first mold and has a sucking mechanism configured to suck a film to be supplied at a time of molding, wherein the second mold has a movable protruding part configured to touch, when the film is sucked, the film before the film touches an outer periphery edge part of a concave part which is formed on the second mold depending on a shape of an article to be molded, so as to temporarily ensure a space between the outer periphery edge part and the film.

The $2^{nd}$ aspect of the present invention is a film in-mold injection mold device according to the $1^{st}$ aspect of the present invention, wherein the movable protruding part is configured to be in a state of protruding from an abutting surface of the second mold or in a state of not protruding from the abutting surface, and the space is temporarily ensured in the state where the movable protruding part protrudes most.

The $3^{rd}$ aspect of the present invention is a film in-mold injection mold device according to the $1^{st}$ or $2^{nd}$ aspect of the present invention, wherein a film-touching part of the movable protruding part, which is configured to touch the film, is constituted with a curved surface.

The $4^{th}$ aspect of the present invention is a film in-mold injection mold device according to any of the $1^{st}$ to $3^{rd}$ aspects of the present invention, comprising a film clamp that is configured to press the film against an abutting surface of the second mold, wherein a position of a portion of the film to be touched by the movable protruding part is on a nearer side of the concave part of the second mold with respect to a position of a portion of the film to be pressed by the film clamp.

The $5^{th}$ aspect of the present invention is a film in-mold injection mold device according to the $3^{rd}$ or $4^{th}$ aspect of the present invention, wherein the film-touching part of the movable protruding part is configured to be inclined, with reference to a mold clamping direction of the first or second mold, toward a side of a center of the concave part of the second mold, and the film-touching part is configured to be positioned, when the movable protruding part protrudes most from an abutting surface of the second mold, on a nearer side of the center of the concave part of the second mold with respect to the outer periphery edge part.

The $6^{th}$ aspect of the present invention is a film in-mold injection mold device according to any of the $1^{st}$ to $5^{th}$ aspects of the present invention, wherein thermal conductivity of a material of the movable protruding part is greater than thermal conductivity of a material of the first or second mold, and a temperature control circuit part configured to control temperature of the movable protruding part is provided within the movable protruding part.

The 7th aspect of the present invention is a molding method for the article to be molded using the film in-mold injection mold device according to the 1st aspect of the present invention, wherein the movable protruding part is, while the sucking mechanism sucks the film, allowed to recede to a side of an abutting surface of the second mold.

As above, a film in-mold injection mold device of the present invention and a molding method using the same are capable of effectively alleviating local extension of the film to be supplied at the time of molding, compared with conventional ones.

BRIEF DESCRIPTION OF THE DRAWINGS

FIGS. 5A-5E are schematic drawings that show each of the states of the present embodiment where the film is sucked and the inclined movable unit then recedes;

FIG. 6 is a schematic plan view that shows an example of a configuration of a film in-mold injection mold device of the present embodiment;

Figure 1:
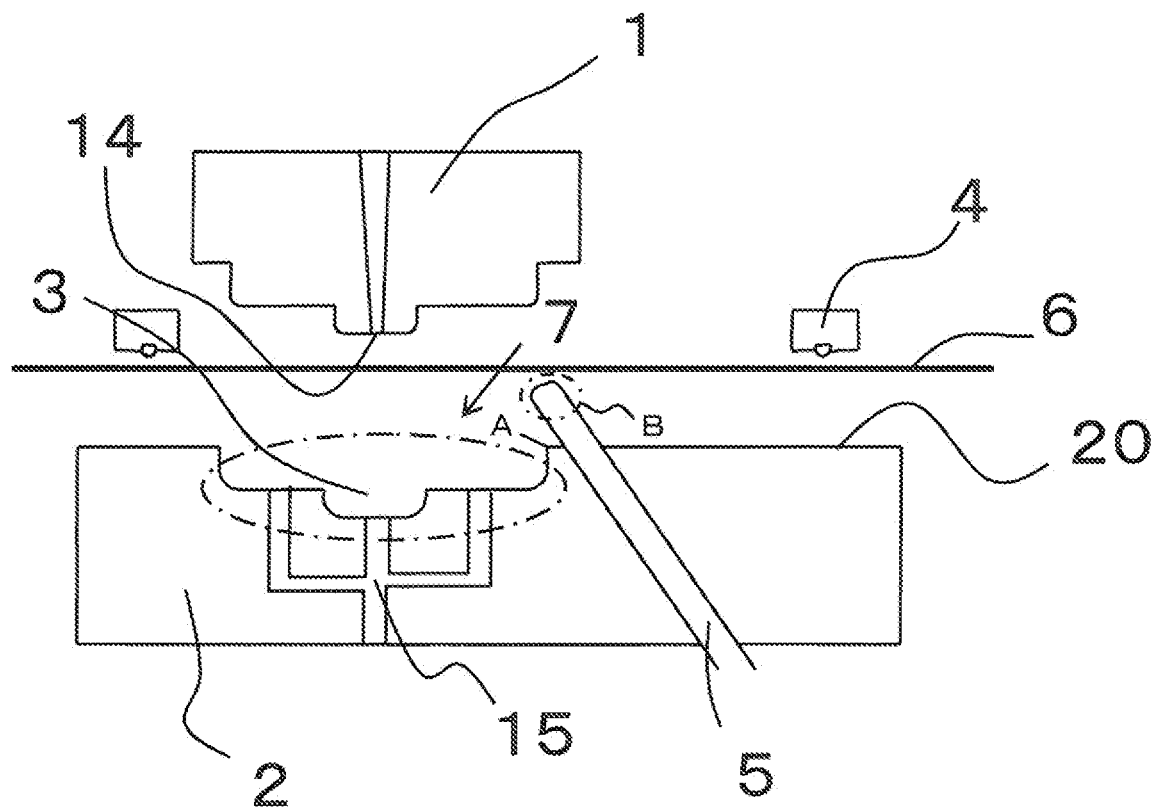
FIG. 1 is a schematic drawing that shows a configuration of a film in-mold injection mold device at the time of mold opening of an embodiment of the present invention.

DESCRIPTION OF SYMBOLS 1 non-decorative-face-side insert
2 decorative-face-side insert
3 product-shaping part
4 foil-presser plate with O-ring
5 inclined movable unit
6 decorative film
7 leading-in direction
8 inclined plane
9 edge part
10 temperature control circuit
11 box-shaped molded article
14 injection port
15 first sucking mechanism
16 gap
17 moving hole
A mold edge
B tip

PREFERRED EMBODIMENTS OF THE INVENTION

Hereinafter, embodiments of the present invention are described with reference to the drawings.

Embodiment 1

FIG. 1 is a drawing that shows a configuration of a film in-mold injection mold device at the time of mold opening in Embodiment 1 of the present invention.

In FIG. 1, the reference numeral 1 denotes a non-decorative-face-side insert, the reference numeral 2 denotes a decorative-face-side insert, the reference numeral 3 denotes a product-shaping part engraved on the decorative-face-side insert 2, the reference numeral 4 denotes a foil-presser plate with an O-ring for film clamping, the reference numeral 5 denotes an inclined movable unit, the reference numeral 6 denotes a decorative film, and the reference numeral 7 denotes a leading-in direction in which the decorative film 6 is led in at the time of sucking. The reference numeral 14 denotes an injection port configured to inject a molten resin of a molding material, and the reference numeral 15 denotes a first sucking mechanism configured to suck the decorative film 6 to the side of the decorative-face-side insert 2. The decorative-face-side insert 2 is configured so that the film-clamping face 20 is at the highest position in the decorative-face-side insert 2 and the product-shaping part 3 is engraved on the film-clamping face 20. The inclined movable unit 5 is configured to be held, protruding from the film-clamping face 20, at forward positions sticking out from the film-clamping face 20 of the decorative-face-side insert 2. Moreover, the tip B of the inclined movable unit 5 is positioned on the nearer side of the center of the product-shaping part 3 with respect to the outermost periphery of the product-shaping part 3 of the decorative-face-side insert 2.

Further, the mold edge A is a mold edge existing on the outermost periphery of the product-shaping part 3.

Moreover, in order to facilitate an easy understanding of the principle of the present invention, FIG. 1 shows a case of a simple configuration such that the inclined movable unit 5 is provided in one place. Similarly, FIGS. 3 and 4 to be described later also show cases of simple configurations. Since the mold edge A exists on the outermost periphery of the product-shaping part 3, it is desirable that the inclined movable units 5 be arranged to almost surround the outermost periphery of the product-shaping part 3, and such a configuration is further described later (see FIG. 6).

Here, an example of the first mold of the present invention is the non-decorative-face-side insert 1 of the present embodiment, and an example of the second mold of the present invention is the decorative-face-side insert 2 of the present embodiment. Moreover, an example of the abutting surface of the second mold of the present invention is the film-clamping face 20 of the present embodiment, and an example of the movable protruding part of the present invention is the inclined movable unit 5 of the present embodiment, or the inclined movable units 5a1-5b4 (see FIG. 6) to be described later. Moreover, an example of the sucking mechanism of the present invention is a component including the first sucking mechanism of the present embodiment and the second sucking mechanism to be described later.

Figure 2:
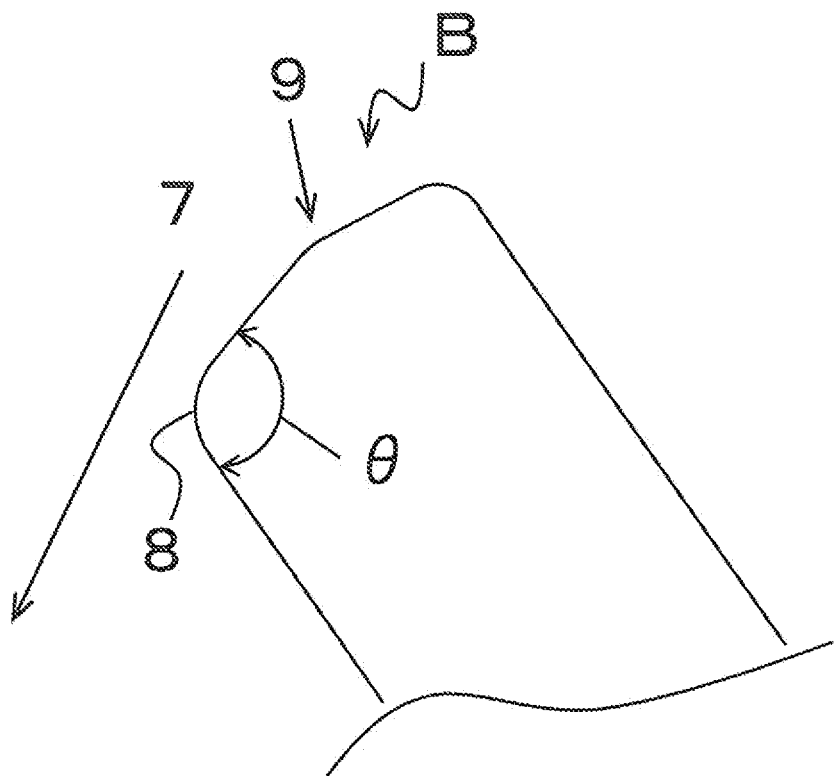
FIG. 2 is an enlarged view of the tip B of the inclined movable unit of the present embodiment.

FIG. 2 is an enlarged view of the tip B of the inclined movable unit 5 shown in FIG. 1.

The reference numeral 8 denotes an inclined plane such that the angle θ with regard to the leading-in direction 7 of the decorative film 6 is an obtuse angle, and the reference numeral 9 denotes an edge part for the angle starting point of the inclined plane 8.

It is desirable that the shape of the tip B of the inclined movable unit 5 be a smooth shape such that the decorative film 6 is not caught with regard to the leading-in direction 7 of the decorative film 6. For example, a shape is desirable such that (i) round shapes with curvature radius R of 0.5 mm or more are provided at the angle parts of the tip B of the inclined movable unit 5 on the side of the center of the mold and its outer side so that the inclined plane 8 is formed as described above, and (ii) a round shape is provided at the edge part 9. Further, an example of the shape of the edge part 9 is a shape of a smooth curved surface with minimum curvature radius R of 0.5 mm or more, which does not cause damages and so forth of the decorative film 6 to occur. Accordingly, it is desirable that the shape of the tip B of the inclined movable unit 5 be not any of an edge shape, a chamfer-plane shape, and a round shape with small curvature radius.

But, even if the tip B of the inclined movable unit 5 is constituted, as described above, with a shape that is smooth with regard to the leading-in direction 7 of the decorative film 6, when the slippage of the decorative film 6 is impaired due to its surface state, the decorative film 6 will be fixed at the tip B of the inclined movable unit 5, which can cause occurrence of wrinkles on the surface of the decorative film 6 at the time of film sucking, leading to imperfect molding. For that reason, it is desirable that the surface state of the tip B of the inclined movable unit 5 possess slippage such that the decorative film 6 is smoothly led in at the time of sucking. For example, it is desirable that the surface state of the tip B of the inclined movable unit 5 be either a mirror-like state or a state with a surface coating to improve surface slippage. Alternatively, the inclined movable unit 5 may be configured with a rotatable roller at its tip.

Figure 3:
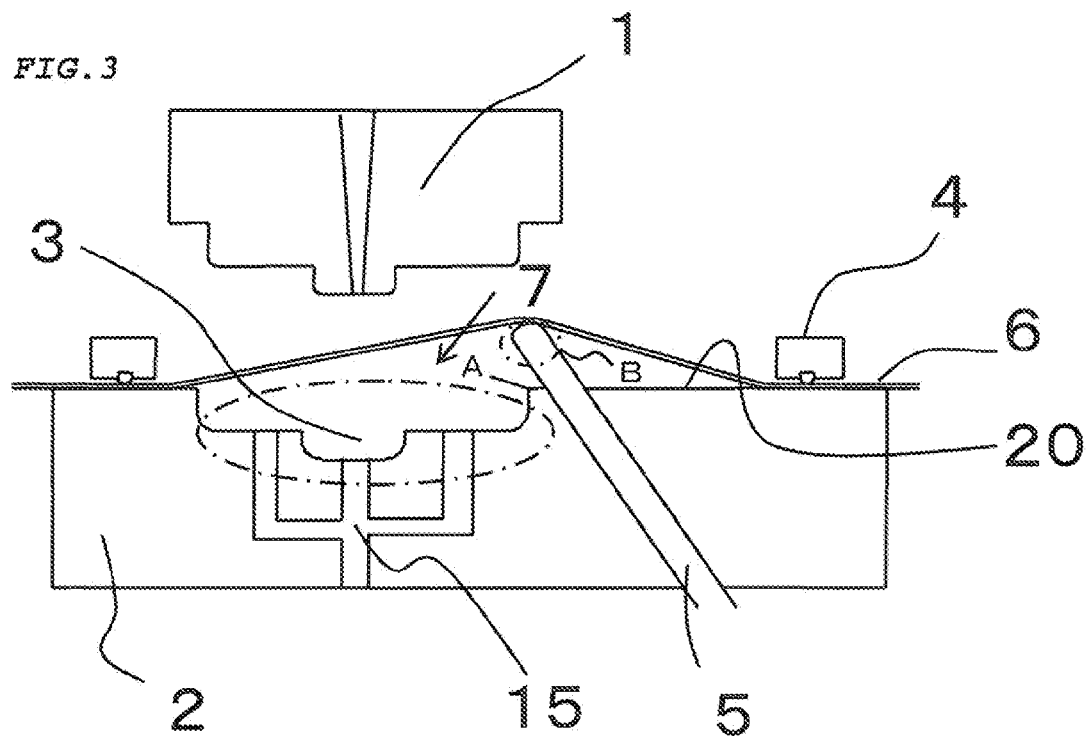
FIG. 3 is a schematic drawing that shows a state where the decorative film is clamped with the foil-presser plates of the present embodiment.

FIG. 3 shows a state where the decorative film 6 is clamped with the foil-presser plates 4 as shown in FIG. 1. The decorative film 6 is, with the foil-presser plates 4 being moved to the side of the decorative-face-side insert 2, pressed and clamped against the film-clamping face 20 of the decorative-face-side insert 2.

At this time, since the inclined movable unit 5 is held at a position sticking out from the film-clamping face 20 towards the non-decorative-face-side insert 1, the clamped decorative film 6 touches the tip B of the inclined movable unit 5, and the touched part is in a state of being lifted up from the film-clamping face 20.

Regarding this point, the difference from the conventional device is further described.

Figure 9:
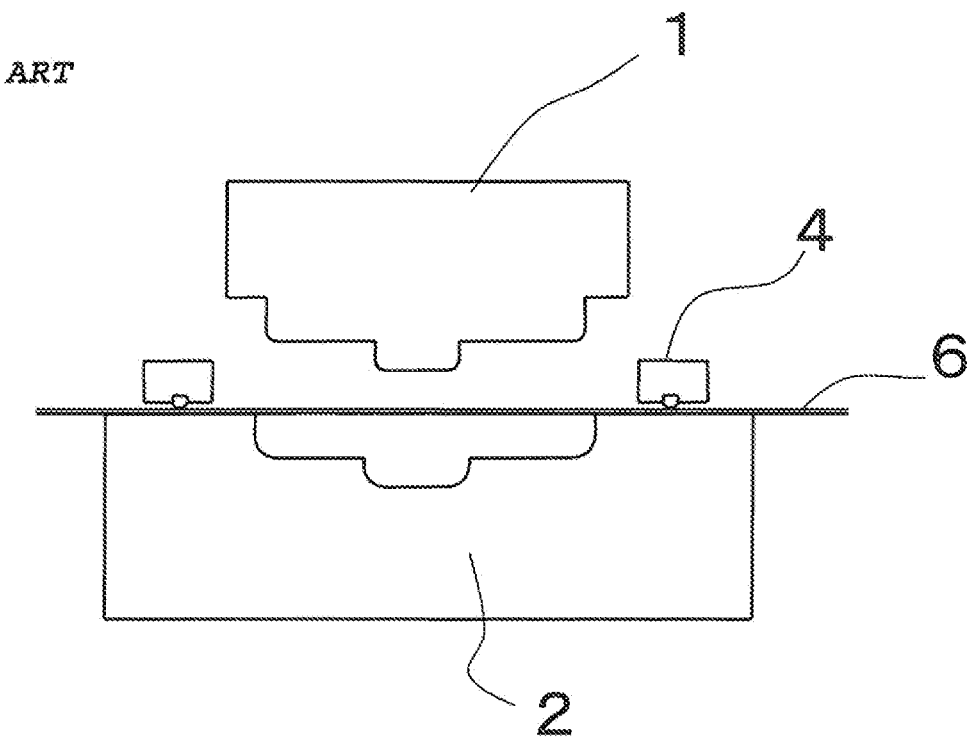
FIG. 9 is a drawing of a general conventional film in-mold injection mold device in a state where the film is clamped.
Figure 10:
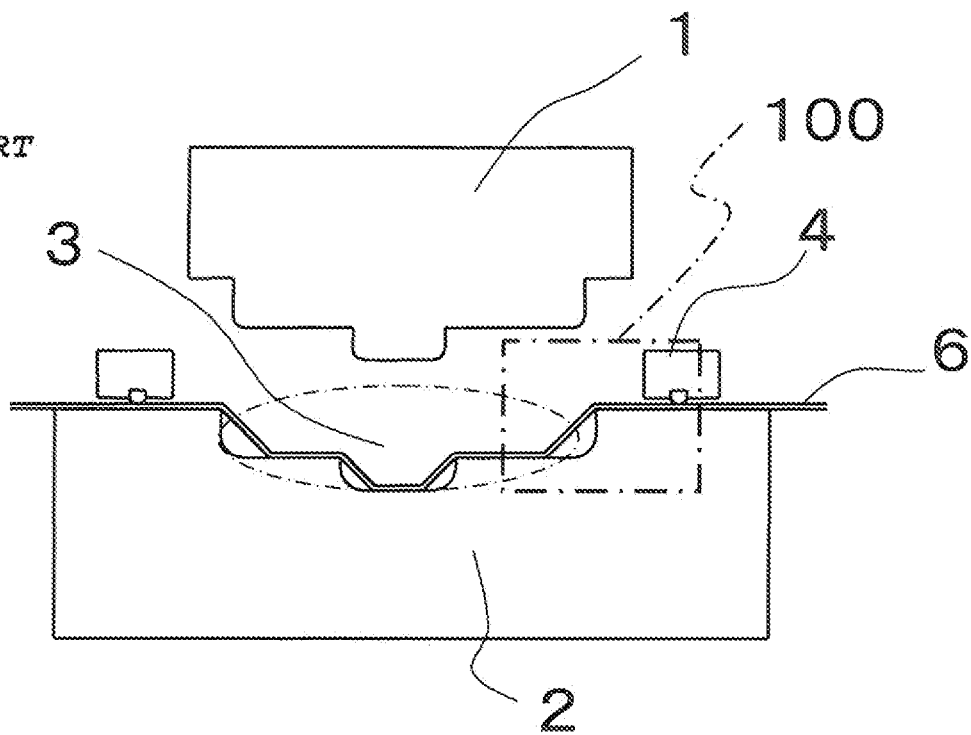
FIG. 10 is a drawing of a general conventional film in-mold injection mold device in a state where the film is sucked.
Figure 11:
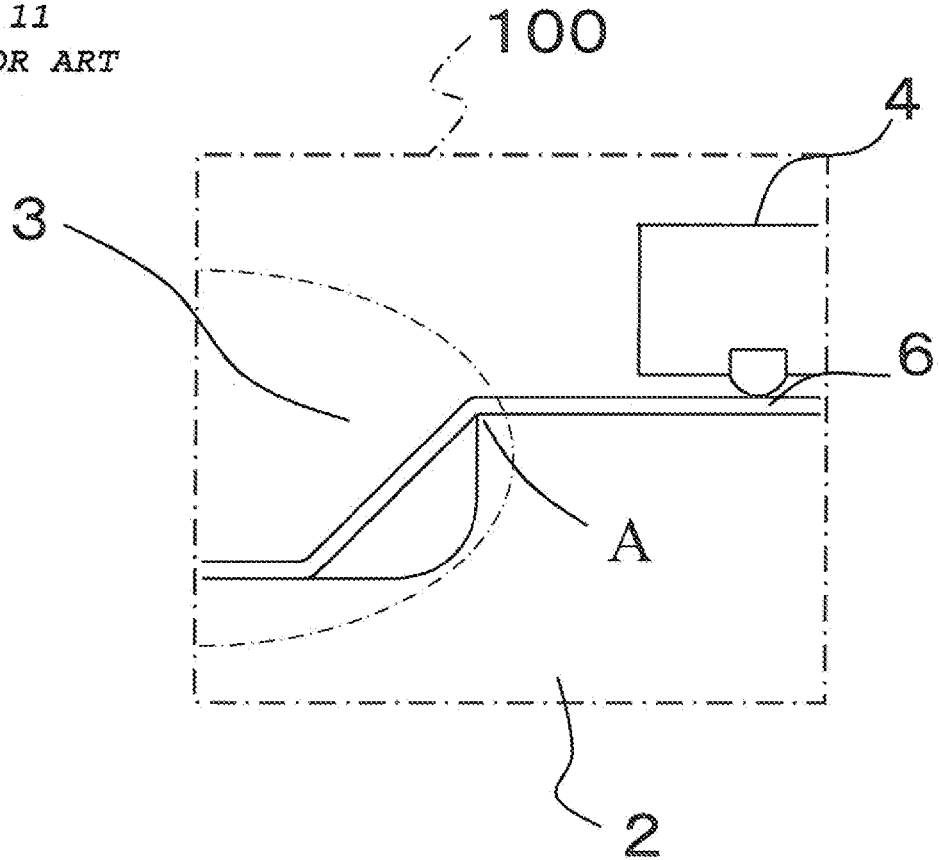
FIG. 11 is an enlarged view of a conventional film in-mold injection mold device in a state where the film is sucked.

In the configuration of the conventional device, as shown in FIG. 9, in a case where the decorative film 6 has been clamped, since the decorative film 6 inside the foil-presser plates 4 is fixed in a planar state, it is impossible to lead, from the range outside the foil-presser plates 4, the decorative film 6 in at the time of film sucking. For that reason, in a case where a high extension percentage is required of the decorative film 6, the decorative film 6 will fail to completely fit the decorative-face-side insert 2, which can cause the decorative film 6 to break at the time of mold clamping.

But the configuration of the present embodiment effectively enables the film to easily fit the insert 2 because, as shown in FIG. 3, the area of the film capable of being taken in to the inside of the foil-presser plates 4 increases owing to the lift-up of the surface of the film compared with the configuration of the conventional device, which is able to ensure a film surplus beforehand as room for extension at the time of film sucking.

Namely, the configuration of the present embodiment enables the initial setting height of the inclined movable unit 5 (the height from the film-clamping face 20) to be changed depending on the engraving depth of the product-shaping part 3 of the decorative-face-side insert 2. Specifically, in a case where the engraving depth of the product-shaping part 3 of the decorative-face-side insert 2 gets shallow, the height is set up so that the inclined movable unit 5 is positioned to get close to the film-clamping face 20 and, in a case where the engraving depth gets deep, the height is set up so that the inclined movable unit 5 is positioned to get away from the film-clamping face 20.

Further, the initial setting height of the inclined movable unit 5 is adjustable suitably depending on a difference in the thickness or material specification of the decorative film 6 even if the engraving depth of the decorative-face-side insert 2 is the same.

Moreover, since the inclined movable unit 5 of the present embodiment is configured such that the initial setting height is adjustable, when the initial setting height is finally decided, it is possible to decide, by experimentally molding products with the initial setting height being varied little by little, the optimal initial setting height from the results.

Moreover, when the inclined movable unit 5 of the present embodiment is configured so as to be separable from the given decorative-face-side insert 2 and combinable with another decorative-face-side insert 2, it is possible to use one inclined movable unit 5 as common parts along with different decorative-face-side inserts 2.

Figure 4:
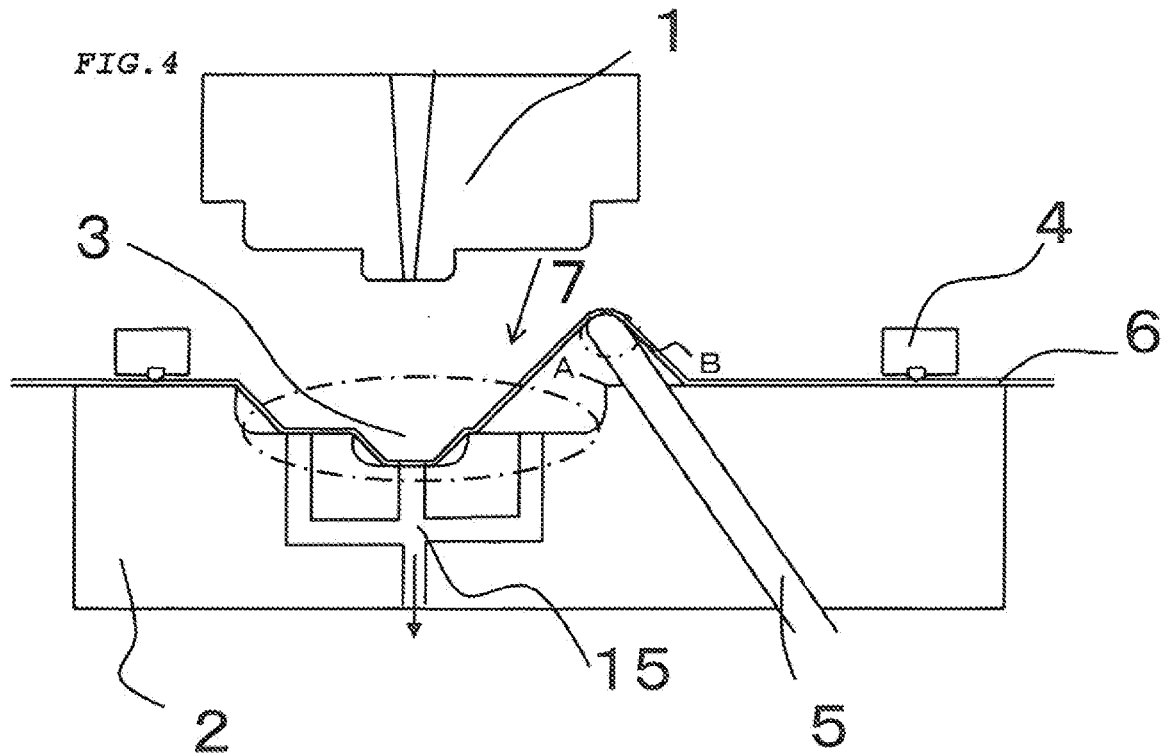
FIG. 4 is a schematic drawing that shows a state where the decorative film of the present embodiment has been sucked.
Figure 7A:
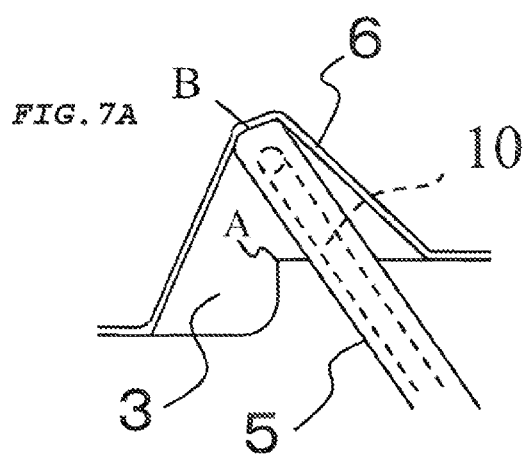
FIGS. 7A-7E are schematic drawings that show each of the states of Embodiment 2 where the film is sucked and the inclined movable unit then recedes.
Figure 7C:
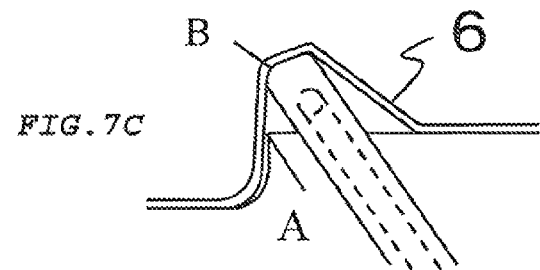
Figure 7D:
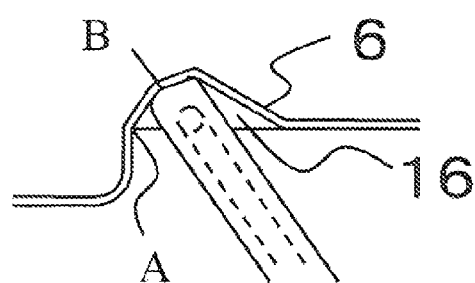
Figure 7B:
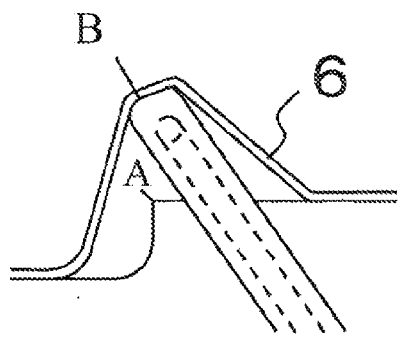
Figure 7E:
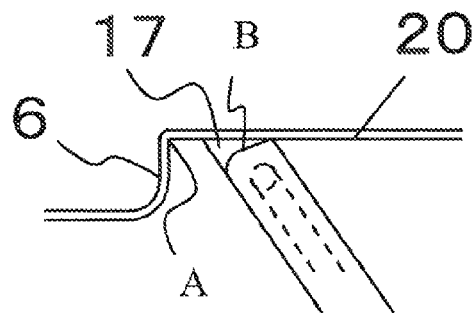
Figure 8:
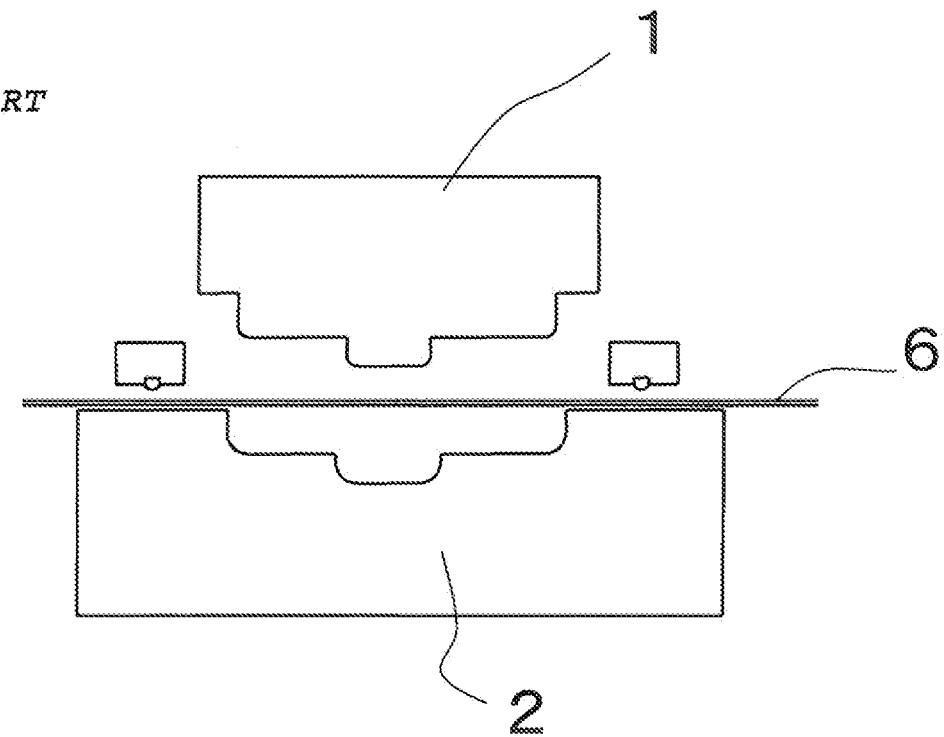
FIG. 8 is a tectonic profile of a general conventional film in-mold injection mold device.

FIG. 4 shows a state where the decorative film 6, which was in a state shown in FIG. 3, has been sucked by operating the first sucking mechanism 15. The decorative film 6 lifted up by the inclined movable unit 5, at this point, does not touch the mold edge A of the product-shaping part 3 of the decorative-face-side insert 2.

Steps A-E shown in FIGS. 5A-5E represent, in time series, states of the decorative film 6 where it is sucked to be attracted to the decorative-face-side insert and the inclined movable unit 5 then recedes to the mold abutting surface. In FIGS. 5A-5E, the elements similar to those shown in FIGS. 1-3 are denoted with the same reference numerals, and a detailed description thereof is omitted.

Step A shown in FIG. 5A describes a state where the sucked decorative film 6 has been attracted to the decorative-face-side insert 2. The decorative film 6, which is held by the tip B of the inclined movable unit 5, does not touch the mold edge A of the decorative-face-side insert 2. Moreover, the tip B of the inclined movable unit 5 is positioned on the nearer side of the center of the product-shaping part 3 with respect to the mold edge A of the decorative-face-side insert 2.

Step B shown in FIG. 5B describes a state where the inclined movable unit 5 starts to recede to the side of the mold abutting surface. The inclined movable unit 5, while descending regarding the height direction, gradually approaches the mold edge A of the decorative-face-side insert 2. While a film surplus, which occurs owing to the inclined movable unit 5 that is descending, stays in contact with the tip B of the inclined movable unit 5 and slides on its surface, the decorative film 6 with no flexure in a state of keeping the tension gradually fits the product-shaping part 3 without touching the mold edge A.

Step C shown in FIG. 5C describes a state where the inclined movable unit 5 further recedes. The position of the inclined movable unit 5 is almost the same as the position of the mold edge A of the decorative-face-side insert 2. The decorative film 6, which is in a state of almost completely fitting the product-shaping part 3, still does not touch the mold edge A of the decorative-face-side insert 2.

Step D shown in FIG. 5D describes a state where the inclined movable unit 5 has almost completely finished receding. The inclined movable unit 5 has receded to the outer side of the mold edge A of the decorative-face-side insert 2. The decorative film 6 touches, at this point, the mold edge A of the decorative-face-side insert 2 at long last. At this point, the decorative film 6 is in a state where the most part fits the wall surface of the product-shaping part 3, and a high extension percentage is thus not required of the decorative film 6.

Step E shown in FIG. 5E describes a state where the inclined movable unit 5 has completely finished receding. The inclined movable unit 5 has receded to the film-clamping face 20 of the decorative-face-side insert 2. Since the inclined movable unit 5 does not finally give a convex portion because it recedes to the mold abutting surface, subsequent molding is not adversely affected.

Further, the moving hole 17 for movement of the inclined movable unit 5 is provided in the decorative-face-side insert 2 (see FIG. 5E), and the air remaining in the gap 16 shown in FIG. 5D is, via a sucking drain (not shown) formed in the inner wall of the moving hole 17, sucked by a second sucking mechanism (not shown) and drained away to the outside between Steps D and E. In this way, it is possible to prevent wrinkles due to the remaining air from occurring.

Since the decorative film 6 is not caught at the mold edge A owned by the product-shaping part 3 of the decorative-face-side insert 2, (i) damages and breaks do not occur on its surface, (ii) because a high extension percentage is not partially required, a film decorative layer is not extended out and pale color of the decorative face is thus not caused, and (iii) microcracks also do not occur. And the decorative film 6 is sucked in a state of fitting the product-shaping part 3 of the decorative-face-side insert 2. In this state, the film in-mold resin injection molding proceeds to the mold clamping step that is the next process.

FIG. 6 is a drawing that shows an example of a specific configuration of a film in-mold injection mold device in Embodiment 1 of the present invention.

In FIG. 6, the reference numeral 11 denotes a box-shaped molded article with deep drawing shape engraved on the decorative-face-side insert 2.

In the present embodiment, the inclined movable units 5 are arranged all over the outer periphery of the product shape in order to allow the sucked decorative film 6 to fit the product shape of the box-shaped molded article 11 with deep drawing shape without damages and breaks, and thinning of a pigmented layer and occurrence of microcracks due to local extension. Eight inclined movable units 5 are arranged in total, where one unit is arranged at each of the four longitudinal/lateral edges of the product shape (see the inclined movable units 5a1-5a4 shown in FIG. 6) and one unit is arranged at each and every angle part between the longitudinal/lateral edges (see the inclined movable units 5b1-5b4 shown in FIG. 6).

Each of the inclined movable units 5a1-5b4 works as described with the time series of Steps A-E shown in FIGS. 5A-5E.

In the present embodiment, in a case where one unit is arranged only at each of the four longitudinal/lateral edges of the product shape and sucking is implemented without the inclined movable units 5b1-5b4 being arranged, the function of the present configuration may not be sufficiently realized at each of the four angle parts between the longitudinal/lateral edges. For that reason, as shown in FIG. 6, the inclined movable units 5b1-5b4 towards the side of the center of the mold are arranged at each of the four angle parts between the longitudinal/lateral edges so as to sufficiently realize the function of the present configuration over the periphery of the product shape.

By yielding such a state where the decorative film 6 is sucked with the inclined movable units 5, damages and breaks on the surface of the decorative film 6 are prevented. At the same time, it is also possible to prevent thinning of a pigmented layer and occurrence of microcracks due to local extension of the decorative film 6.

As described above, the film in-mold injection mold device of the present embodiment is capable of realizing a configuration such that, with the inclined movable unit(s) 5 on a face inside the foil-presser plates 4 where the decorative film to be placed, control of a base point of the extension of the decorative film 6 and its leading-in is performed.

The aforementioned configuration enables a base point of the extension at the time of film sucking to be provided separately from the mold edge A, and it is thus possible to assist the extension of the decorative film 6 and its leading-in to perform their control.

As above, the film in-mold injection mold device of the present embodiment enables, in film in-mold resin injection molding such that high extension percentages are required, the decorative film 6 to fit the mold decorative face without damages and breaks of the decorative film 6 at the time of film sucking, and thinning of a pigmented layer and occurrence of microcracks due to local film extension.

Embodiment 2

Next, in the present embodiment, a case is described where the thermal conductivity of the material of the inclined movable unit(s) 5 described in the aforementioned embodiment is allowed to be different from the thermal conductivity of the material of the decorative-face-side insert 2.

In FIGS. 7A-7E, Steps A-E represent, in time series, states of the decorative film 6 in Embodiment 2 of the present invention where it is sucked to be attracted to the decorative-face-side insert 2 and the inclined movable unit 5 then recedes. Since the states of Steps A-E shown in FIGS. 7A-7E are similar to those shown in FIGS. 5A-5E of Embodiment 1 of the present invention, a detailed description thereof is omitted to avoid repetition.

In the present embodiment, since the inclined movable unit 5 and the decorative-face-side insert 2 are configured as separate parts, materials with the relation $\alpha > \beta$ are utilized, where $\alpha$ denotes the thermal conductivity of the material of the inclined movable unit 5 and $\beta$ denotes the thermal conductivity of the mold material that constitutes the decorative-face-side insert 2.

As an example, when the material of the inclined movable unit 5 is copper (the thermal conductivity of which is 372 W/(m·K) at 20° C.) and the mold material of the decorative-face-side insert 2 is carbon steel (the thermal conductivity of which is 53 W/(m·K) at 20° C.), the obtained heat transfer effect is approximately 7 times as much as that in a case where the inclined movable unit 5 is made of carbon steel. In this way, heat exchange of high efficiency with the film is possible.

The material of the decorative film 6 that is generally utilized in film in-mold resin injection molding is PET film. A property of PET film is that it is capable of being more easily extended when the film temperature is higher.

As an example, in a case where a test-piece PET film (hereinafter referred to as the test piece) with a width of 10 mm is stretched at 60° C., the tensile force required to get a 200% length after extension is 38 N when the original length of the test piece is assumed to be 100%. On the one hand, in a case where the test piece is similarly stretched at 100° C., the required tensile force is 28 N. In film in-mold resin injection molding, the film extension percentage obtained in a case where the film sucking is performed with a setting such that the mold temperature is 60° C. and the inclined movable unit 5 is kept at 100° C. is approximately 1.35 times as large as that obtained in a case where the film sucking is performed with a setting such that the mold temperature is 60° C. and the inclined movable unit 5 is kept at 60° C.

In FIGS. 7A-7E, the reference numeral 10 denotes a drawing that shows a temperature control circuit such as a sheathed heater placed in the inclined movable unit 5, and so on.

The above-described temperature setting is possible by temperature control treating the temperature control circuit 10 placed in the inclined movable unit 5, which is shown in FIGS. 7A-7E, as a circuit separate from a mold temperature control circuit.

A configuration like this enables the film sucking control of the decorative film 6 to be performed more reliably by heat exchange of high efficiency and partial temperature control of the decorative film 6.

Other various specific ways that could be considered to realize an object of the present invention, which has been described above utilizing several examples of the afore-mentioned embodiments, also fall within the scope of the present invention, including various modifications thereof that would be easily understood by those skilled in the art.

A film in-mold injection mold device of the present invention and a molding method using the same are capable of effectively alleviating local extension of the film to be supplied at the time of molding, compared with conventional ones, and are useful for a film in-mold resin injection mold device and a molding method using the same, for example.

What is claimed is:

1. A film in-mold injection mold device, comprising:
   a first mold that has an injection port configured to inject a molding material; and
   a second mold that is configured to face the first mold and has a sucking mechanism configured to suck a film to be supplied at a time of molding, wherein
   the second mold has a movable protruding part configured to touch, when the film is sucked, the film before the film touches an outer periphery edge part of a concave part which is formed on the second mold depending on a shape of an article to be molded, so as to temporarily ensure a space between the outer periphery edge part and the film,
   the movable protruding part is configured to be in a state of protruding from an abutting surface of the second mold or in a state of not protruding from the abutting surface, and
   the space is temporarily ensured in the state where the movable protruding part protrudes most,
   a film-touching part of the movable protruding part, which is configured to touch the film, is constituted with a curved surface,
   the film-touching part of the movable protruding part is configured to be inclined, with reference to a mold clamping direction of the first or second mold, toward a side of a center of the concave part of the second mold,
   the film-touching part is configured to be positioned, when the movable protruding part protrudes most from an abutting surface of the second mold, on a nearer side of the center of the concave part of the second mold with respect to the outer periphery edge part, and
   a sucking drain is formed in an inner wall of a moving hole for movement of the movable protruding part.

2. A film in-mold injection mold device according to claim 1, comprising a film clamp that is configured to press the film against an abutting surface of the second mold, wherein
   a position of a portion of the film to be touched by the movable protruding part is on a nearer side of the concave part of the second mold with respect to a position of a portion of the film to be pressed by the film clamp.

3. A film in-mold injection mold device according to claim 1, wherein
   thermal conductivity of a material of the movable protruding part is greater than thermal conductivity of a material of the first or second mold, and
   a temperature control circuit part configured to control temperature of the movable protruding part is provided within the movable protruding part.

* * * * *